(12) United States Patent
Shapiro et al.

(10) Patent No.: US 7,554,924 B1
(45) Date of Patent: Jun. 30, 2009

(54) METHOD FOR DETECTING DUPLICATE GLOBAL PORT IDENTIFIERS

(75) Inventors: Jeremy N. Shapiro, Brighton, MA (US); Srinivas Madhur, Westford, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 597 days.

(21) Appl. No.: 11/123,320

(22) Filed: May 6, 2005

(51) Int. Cl.
*G01R 31/08* (2006.01)

(52) U.S. Cl. .................. 370/242; 370/392; 370/389
(58) Field of Classification Search .......... None
See application file for complete search history.

(56) References Cited

U.S. PATENT DOCUMENTS

| | | | | |
|---|---|---|---|---|
| 2002/0156888 | A1* | 10/2002 | Lee et al. | 709/224 |
| 2003/0208572 | A1* | 11/2003 | Shah et al. | 709/223 |
| 2004/0202189 | A1* | 10/2004 | Arndt et al. | 370/409 |
| 2005/0088979 | A1* | 4/2005 | Mehra | 370/254 |
| 2006/0155880 | A1* | 7/2006 | Elnozahy et al. | 710/1 |

* cited by examiner

*Primary Examiner*—Duc C Ho
(74) *Attorney, Agent, or Firm*—Brooks & Kushman P.C.

(57) ABSTRACT

The present invention provides methods of checking for duplicate port globally unique identifiers during a discovery of a subnet of a system using a channel adapter. These methods allow a Subnet Manager, an Infiniband entity for managing the Infiniband topology, to detect invalid ports that have matching GUIDs. An additional feature is that a recently added port with a duplicate GUID will not replace an original port with the same GUID, but instead will be left out of the network.

10 Claims, 3 Drawing Sheets

METHOD FOR DETECTING DUPLICATE GLOBAL PORT IDENTIFIERS

TECHNICAL FIELD

The present invention generally relates to networked systems, and particularly the detection of duplicate globally unique identifiers, more particularly in an Infiniband network.

BACKGROUND INFORMATION

Infiniband (IB) is a high speed interconnect with fabrics consisting of switches and channel adapters. The channel adapters are devices that generate and consume packets sent and received over a port connected to the Infiniband fabric. Channel adapters connect end nodes to the fabric. The switches are used to route packets over the fabric to and from the channel adapters. Switches may have up to 255 ports wherein every port on a switch has the same vendor assigned globally unique identifier (GUID). A channel adapter may also have up to 254 ports but every port on the channel adapter has one vendor assigned unique globally unique identifier (GUID). The vendor assigned GUIDs are referred to as base GUIDs and a node may have one or more software assigned GUIDs. This invention pertains to the uniqueness, or the lack thereof, of the base GUIDs and all further references to GUID in this invention refer to the base GUID. The GUIDs function like Ethernet MACs, and are used in the routing of packet over the fabric.

A grouping of nodes interconnected using channel adapters and switches may be referred to as a subnet. A subnet is further provided under the Infiniband architecture with a Subnet Manager to maintain the topology of a subnet between channel adapters for the purpose of routing packets. The subnet manager does this by keeping track of all the channel adapters and switches that make up the subnet as well as their interconnections. As part of this process, the Subnet manager performs discoveries on the subnet to determine the current configuration of the subnet. The GUIDs are used to identify the individual switches and ports on the subnet. The assignment of base GUIDs to nodes is under vendor's control and erroneous assignment of duplicate GUIDs compromises routing and management of the subnet.

Furthermore, changing GUIDs can be as easy as updating the firmware. Duplicate GUIDs can cause major problems for routing algorithms and Infiniband applications. Therefore, a method is needed for detecting two or more channel adapter ports which have the same GUID.

SUMMARY OF THE INVENTION

The present invention provides systems and methods of checking for duplicate port globally unique identifiers (GUIDs) during a discovery of a subnet of a system using a channel adapter. The methods allow a Subnet Manager (an Infiniband entity for managing the Infiniband topology) to detect channel adapter ports that have matching GUIDs. An additional feature is that a recently added port with a duplicate GUID will not replace an original port with the same GUID, but instead will be left out of the network.

In accordance with a first aspect, the invention involves a method of checking for duplicate port globally unique identifiers on a channel adapter. The checking is performed during a discovery of a subnet of a system using the channel adapter. The method comprises selecting a port, the selected port having a current peer as well as associated stored data regarding the peer for the port, discovery generation for the port; the original peer for the port, and the generation of discovery for the original peer for the port; and determining if there is a change in the peer for the selected port.

In accordance with another aspect, the invention involves a medium holding instructions executable in an electronic device. The instructions comprise selecting a port, the selected port having a current peer as well as associated stored data regarding the peer for the port, generation of discovery for the port; the original peer for the port, and the generation of discovery for the original peer for the port; and determining if there is a change in the peer for the selected port.

In accordance with another aspect, the invention involves a method of checking for duplicate port globally unique identifiers on a channel adapter. The checking is performed during a discovery of a subnet of a system using the channel adapter. The method comprises selecting a port, the selected port having a current peer as well as associated stored data regarding the peer for the port, generation of discovery for the port; the original peer for the port, and the generation of discovery for the original peer for the port; determining if there is a change in the peer for the selected port; and if there has been a change in the peer, determining if there is change in the generation of discovery for the selected port.

In accordance with another aspect, the invention involves a method of checking for duplicate port globally unique identifiers on a channel adapter. The checking is performed during a discovery of a subnet of a system using the channel adapter. The method comprises selecting a port, the selected port having a current peer as well as associated stored data regarding the peer for the port, generation of discovery for the port; the original peer for the port, and the generation of discovery for the original peer for the port; determining if there is a change in the peer for the selected port; if there has been a change in the peer, determining if there is change in the generation of discovery for the selected port; if there is a change in the generation, determining if the previous discovery of the selected port in the current generation of discovery is the duplicate; and if the previous discovery of the selected port is not the duplicate, generating a duplicate port error.

In accordance with another aspect, a networked system is provided that is capable of detecting duplicate port globally unique identifiers. The system comprises a channel adapter and a subnet manager. The channel adapter has one or more ports for sending and receiving packets over a network. Each of the one or more ports has a globally unique identifier, current peer, and associated stored data. The associated stored data includes the peer for the port, generation of discovery for the port; the original peer for the port, and the generation of discovery for the original peer for the port. The subnet manager is in communication with the channel adapter over the network. The subnet manager is capable of selecting a port on the channel adapter and determining if there has been a change in the peer of the port.

In accordance with another aspect, a network node is provided for managing a network comprising at least a channel adapter having one or more ports. The network node comprises a subnet manager capable of selecting a port on the channel adapter, wherein each port on the channel adapter has a current peer and associated data stored on the subnet manager, and determining if the peer of the selected port has changed.

The details of various embodiments of the invention are set forth in the accompanying drawings and the description below. Other features and advantages of the invention will become apparent from the description, the drawings and the claims.

BRIEF DESCRIPTION OF THE DRAWINGS

The foregoing and other objects, aspects, features, and advantages of the invention will become more apparent and may be better understood by referring to the following description taken in conjunction with the accompanying drawings, in which.

DETAILED DESCRIPTION

Certain embodiments of the present invention are described below. It is, however, expressly noted that the present invention is not limited to these embodiments, but rather the intention is that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

Figure 1:
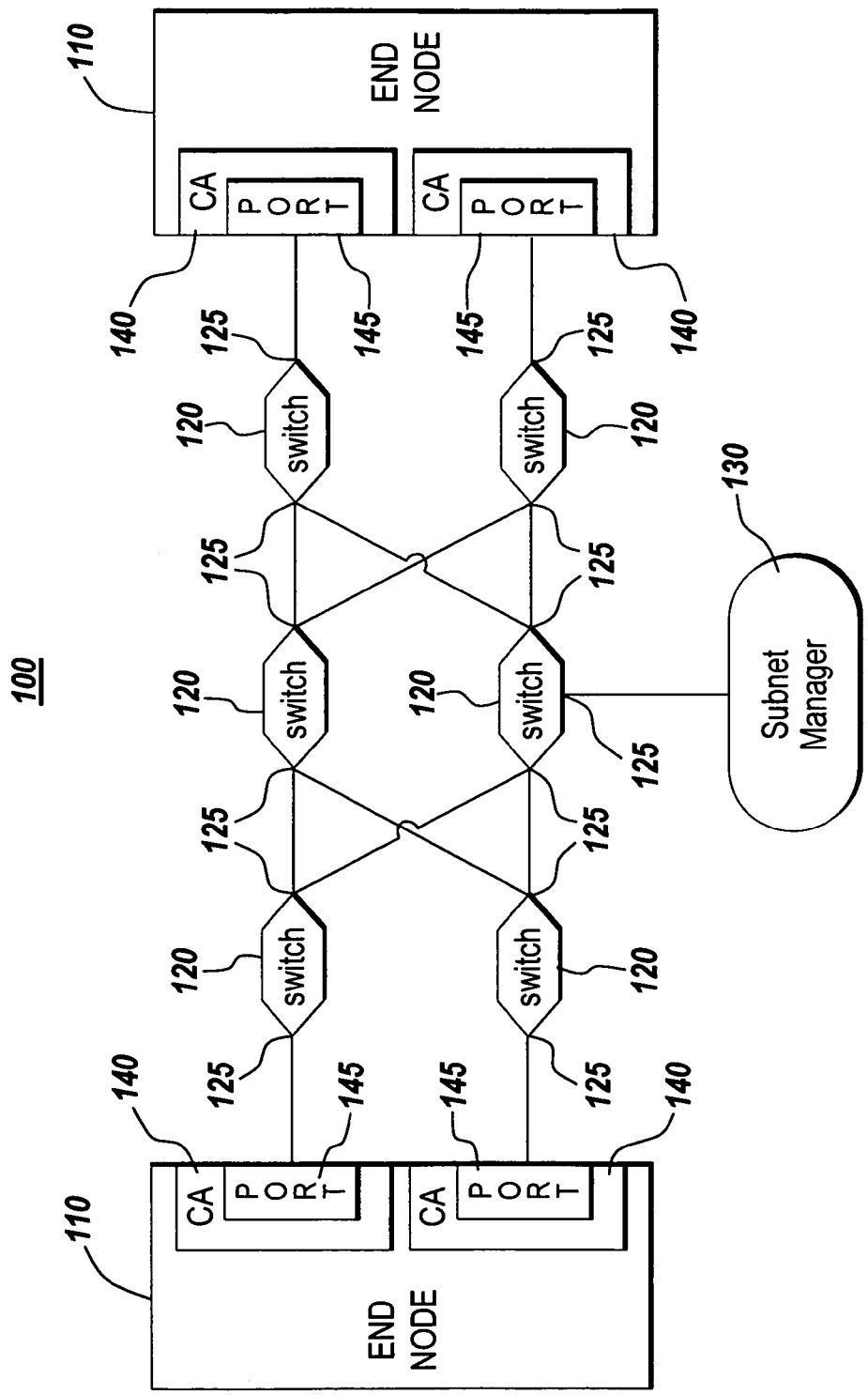
FIG. 1 is a depiction of one embodiment of a system of the present invention.

FIG. 1 depicts one embodiment of a system of the present invention. The system depicted here is a subnet 100. The subnet consists of end nodes 110, switches 120, and a Subnet Manager 130. The end nodes further comprise channel adapters 140 providing the connection to the fabric of the subnet through ports 145.

The end nodes 110 serve as the source and destination for the data being sent over the fabric of the subnet 100. An end node 110 may be an input/output device, processor, server, such as blade, or other types of networked devices. Other possible devices will be apparent to one skilled in the art given the benefit of this disclosure.

Channel adapters 140 provide the end nodes 110 with access to fabric of the subnet 100. Channel adapters 140 are Infiniband devices that generate and consume packets that are routed over the fabric of the subnet 100. The channel adapters 140 have one more ports 145 for sending and receiving packets. Infiniband channel adapters also have up to 254 ports, but each channel adapter port has a unique GUID. Each port 145 on a channel adapter 140 has a globally unique identifier (GUID) that serves to identify the port on the subnet.

Switches 120 make up the bulk of the fabric of the subnet. The switches 120 serve to route packets from one channel adapter 140 to another thus allow data transfer between end nodes 110. The switches have one or more ports 125 for receiving and sending packets. Infiniband switches can have up to 255 ports. Each switch is assigned a globally unique identifier (GUID). Suitable switches will be apparent to one skilled in the art given the benefit of this disclosure.

The Infinband (IB) specification describes the Subnet Manager 130 (SM) as a central entity responsible for discovering, routing, and initializing the subnet 100. In some embodiments the Subnet Manager may exist on an end node 110 or a switch 120 in the subnet.

When discovering the subnet, the Subnet Manager 130 records each port's Infiniband data, including the GUID, the port's peer GUID and port number (if a switch), and the generation count of the discovery. Each time the discovery restarts the generation is incremented. By this methodology, the Subnet Manager 130 is able to determine if it has discovered a port during the current generation.

To detect duplicate GUIDs the Subnet Manager 130 also stores data regarding the original peer of a port as well as the generation of the original peer's discovery. Thus during discovery the Subnet Manager tracks a port's current peer, the port's stored peer, and the port's stored original peer.

A peer port or peer is the port that is on the other end of an interconnect linked to a port. Thus a port that is the destination for packets sent from a port is that port's peer. By keeping track of peers the Subnet Manager 130 is able to determine which channel adapters 140 are connected to which switches 120 which in turn are connected to other switches 120 or channel adapters 140. Using this information, packets can be routed over the fabric of the subnet 100 from one channel adapter 140 to another.

Figure 2:
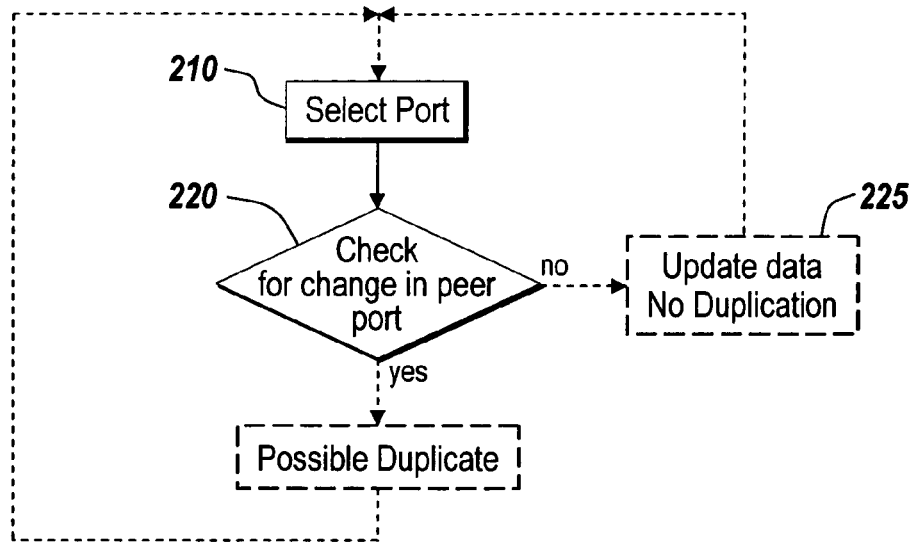
FIG. 2 is a flow chart depicting one embodiment of a method of the present invention.

FIG. 2 is a flow chart 200 illustrating one embodiment of a method of the present invention. The first step 210 of the method involves selecting a port 145 on a channel adapter 140. In this example the port 145 is selected by the Subnet Manager 130. The selected port has a current peer port as well as associated stored data. The stored data includes data regarding the peer for the port, generation of discovery for the port; the original peer for the port, and the generation of discovery for the original peer for the port. The second step 220 of the method is checking for a change in peer of the selected port. If there is no change in the peer then there is no duplication. If there is a change then there is a possibility of duplication. This process may then be repeated for another port.

Preferably, this process is performed by a Subnet Manager 130 during a discovery of a subnet 100 wherein associated stored data for the port is maintained by the Subnet Manager 130. In certain embodiments the step of determining if there is a change in the peer for the selected port comprises comparing the associated stored data regarding the peer with the current peer for the port. Other possible implementations will be apparent to one skilled in the art given the benefit of this disclosure.

In certain embodiments, if no change is detected then the method may further involve updating the associated data and providing indication there is no duplication 225. In this example, this may involve updating the associated stored data regarding the discovery generation to the current generation of discovery, and returning an indication of success i.e. there is no duplication. An example of code that executes this method can be seen below:

```
process_port_check_for_dup (port_data port, int discoveryGen, port peerPort)
    if (port->peerPort==peerPort) {
        // nothing has changed
        port->generation=discoveryGen;
        return SUCCESS
    }
    return FAILURE
```

The code here represents a function "process_port_check_for_dup" that is passed data "port", "discoveryGen" and "peerPort" for processing. Data "port" is the port being processed and is a data structure containing the associated stored data regarding the peer, the generation of discovery, original peer, and generation of original peer. The integer "discoveryGen" is the current generation of discovery. The port "peerPort" is the current peer of the port being processed, it consists of a GUID and port number.

The conditional statement represented here checks if the stored data associated with the port regarding its peer (port- >peerPort) is the same as the current peer port (peerPort). If they are the same then there hasn't been a change. The stored data associated with the port regarding the generation of discovery (port->generation) is then updated to the current generation of discovery (discoveryGen) and an indication that there is no duplication is provided (return Success). If a change is detected then a possible duplication is indicated (return Failure).

Figure 3:
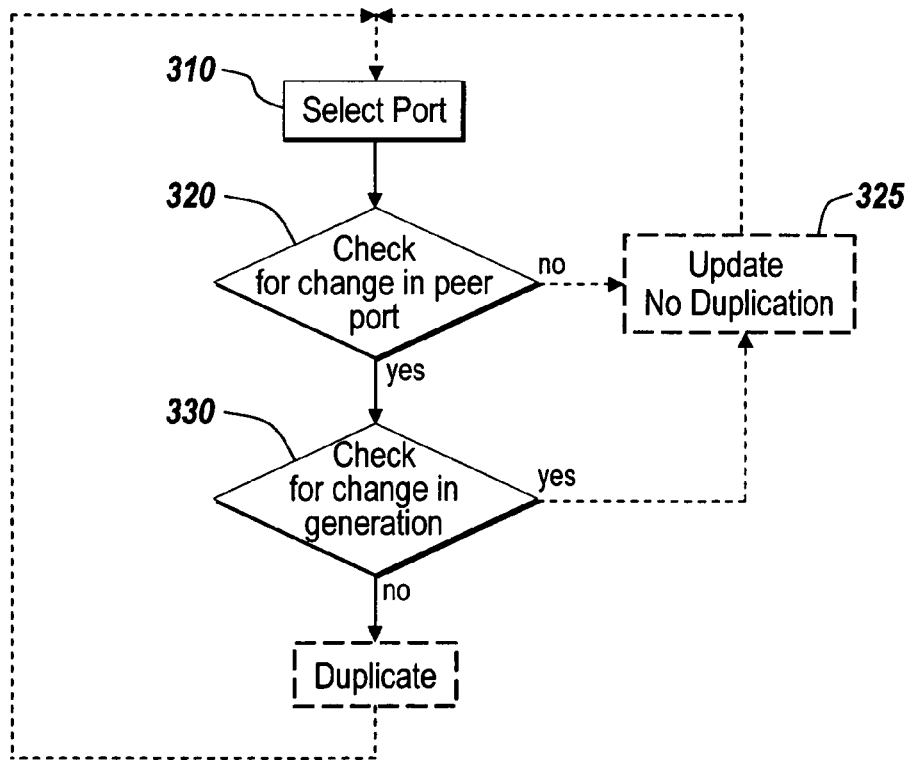
FIG. 3 is a flow chart depicting another embodiment of a method of the present invention.

This process only detects if there has been a change in the peer. Change in the peer could indicate a duplicate but may also just indicate the port has been moved. To determine if it is just a case of the port being moved additional steps may be performed. FIG. 3 is a flow chart 300 of such an embodiment. In this embodiment, the method involves selecting a port 210, determining if there is a change in the peer of the selected port 320, and if a change in the peer is determined, determining if there is a change in the generation of discovery 330. If there has been a change in the generation then there is no duplication. The port was simply moved to a different peer port between discovery generations. If there is no change in the generation, then there is a duplicate.

In certain embodiments, the step of determining if there is a change in the generation of the selected port comprises comparing the associated stored data regarding the generation of discovery with the current generation of discovery. If there is a change in the generation of discovery, then the method may further involve updating the associated data and providing indication there is no duplication 325. In this example, this may involve updating the associated stored data regarding the original peer to the stored data regarding the peer of the port, updating the associated stored data regarding the generation of discovery of the original peer to the stored data regarding the current generation of discovery, updating the associated stored data regarding the peer to the current peer, updating the associated stored data regarding the generation of discovery to the current generation of discovery; and returning an indication of success. An example of code that executes this method can be seen below:

```
process_port_check_for_dup (port_data port, int discoveryGen, port peerPort)
    if (port->peerPort==peerPort) {
        // nothing has changed
        port->generation=discoveryGen;
        return SUCCESS
    }
    // peer of this port has changed
    if (discoveryGen !=port->generation) {
        // peer has changed but generation is different
        // port may have just moved; save original peer info
        port->origPeerPort=port->peerPort
        port->origPeerGen=discoveryGen
        port->peerPort=peerPort;
        port->generation=discoveryGen;
        return SUCCESS
    }
    return FAILURE
```

The first conditional statement, checking for a change in the peer, is the same as the code discussed above. As above, the code is a function "process_port_check_for_dup" that is passed data "port", "discoveryGen" and "peerPort" for processing. Data "port" is the port being processed and is a data structure containing the associated stored data regarding the peer, the generation of discovery, original peer, and generation of original peer. The interger "discoveryGen" is the current generation of discovery. The port "peerport" is the current peer of the port being processed. It consists of a GUID and port number.

The second conditional statement represented here checks if the current generation of discovery (discoveryGen) is not the same as the stored data associated with the port regarding its generation (port->generation). If they are different then the port has probably moved. The stored data associated with the port regarding the original peer (port->origPeerPort) is then updated to the associated stored data regarding the peer (port->peerPort) and associated stored data regarding the generation the original peer is updated (port->origPeerGen) to the current generation (discoveryGen). The associated stored data regarding the peer (port->peerPort) is then updated to the current peer (peerPort), the associated stored data regarding the generation (port->generation) is updated to the current generation (discoveryGen) and an indication that there is no duplication is provided (return Success). If no change in the generation is detected then duplication is indicated (return Failure).

Figure 4:
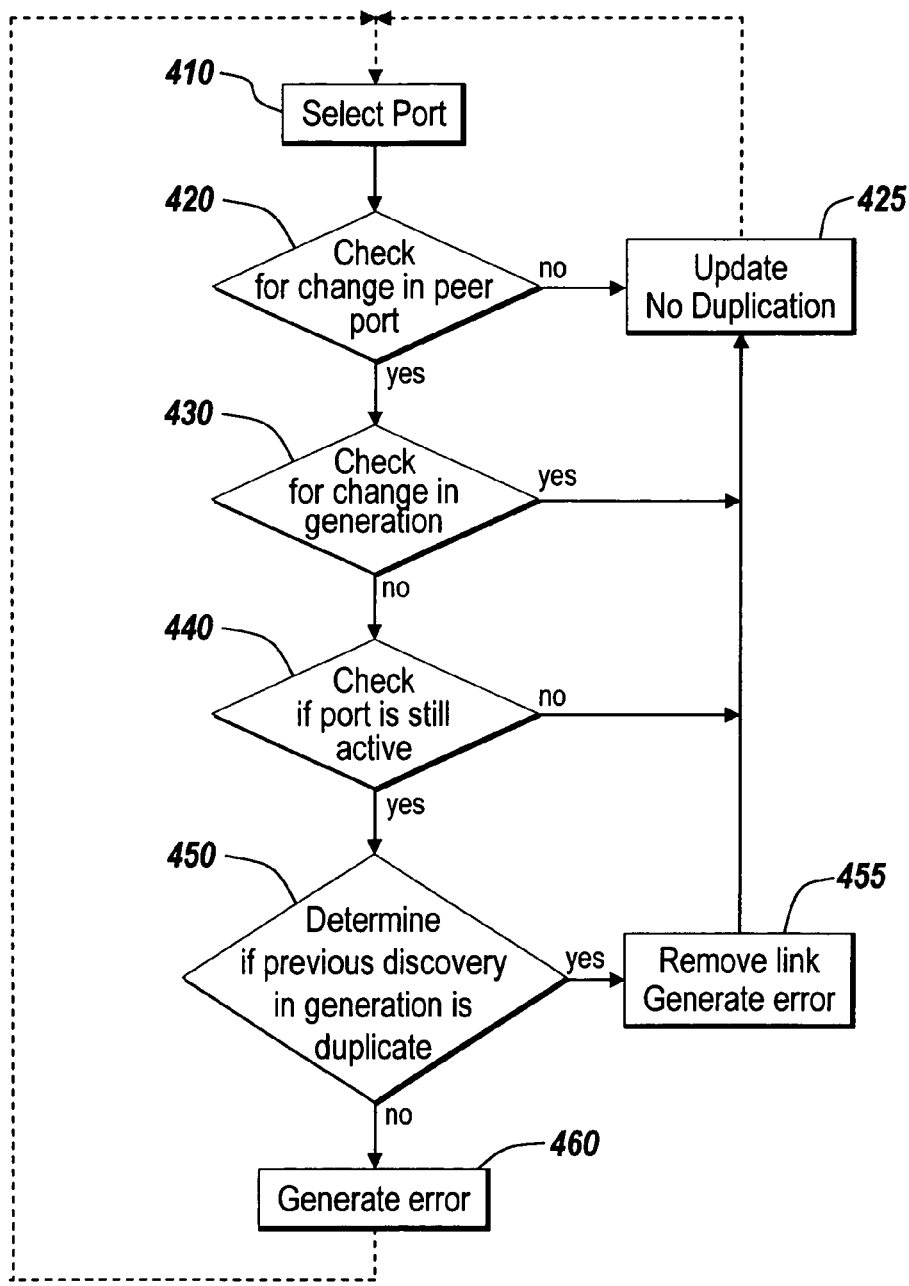
FIG. 4 is a flow chart depicting another embodiment of a method of the present invention.

The second conditional statement determined if the port was moved or if there is a duplicate. The method may also prevent the addition of a duplicate GUID to the subnet. It may ensure that the original port remains on the subnet rather than being replaced by a new duplicate port. FIG. 4 is a flow chart 400 of another such embodiment. In this embodiment, the method involves selecting a port 410, determining if there is a change in the peer of the selected port 420, determining if there is a change in the generation of discovery 430. If there is no change in the generation of discovery, then determining if a previous discovery of the selected port in the current generation is the duplicate 450.

In certain embodiments, the step of determining if the previous discovery of the selected port in the current generation is the duplicate comprises comparing the associated stored data regarding the original peer and the generation of discovery of the original peer with the current peer and current generation of discovery. If the previous discovery is the duplicate, then the method may further involve the steps of removing the link between the port and peer, generating a duplicate port error; updating the associated stored data regarding the peer to the current peer; updating the associated stored data regarding the generation of discovery to the current generation of discovery; and providing indication that there is no duplication 455. If the previous discovery is not the duplicate, then the current discovery is the duplicate and indication of this duplication is provided 360. An example of code that executes this method can be seen below:

```
process_port_check_for_dup (port_data port, int discoveryGen, port peerPort)
    if (port->peerPort==peerPort) {
        // nothing has changed
        port->generation=discoveryGen;
        return SUCCESS
    }
    // peer of this port has changed
    if (discoveryGen !=port->generation) {
        // peer has changed but generation is different
        // port may have just moved; save original peer info
        port->origPeerPort=port->peerPort
        port->origPeerGen=discoveryGen
        port->peerPort=peerPort;
        port->generation=discoveryGen;
        return SUCCESS
    }
    if (port->origPeerGen==discoveryGen && port->origPeerPort==peerPort) {
        // previous discovery of port in this generation was duplicate
```

```
    remove_link (port to peerPort)
    generate_duplicate_port_error ( )
    port->peerPort=peerPort
    port->generation=discoveryGen;
    // return SUCCESS so this port is still processed
    return SUCCESS
}
// peer port is different from the original peer port. This is the
//duplicate link.
generate_duplicate_port_error( )
return FAILURE
```

Here, the first conditional statement, checking for a change in the peer, and the second conditional statement, checking if the generation has changed, are the same as the code discussed above. As above, the code is a function "process_port_check_for_dup" that is passed data "port", "discoveryGen" and "peerPort" for processing. Data "port" is the port being processed and is a data structure containing the associated stored data regarding the peer, the generation of discovery, original peer, and generation of original peer. The integer "discoveryGen" is the current generation of discovery. The port "peerPort" is the current peer of the port being processed, it consists of a GUID and port number.

The third conditional statement represented here checks if the associated stored data regarding the generation the original peer was last updated (port->origPeerGen) and original peer (port->origPeerPort) are the same as the current generation (discoverGen) and current peer (peerPort) respectively. If they are the same then the previous discovery of the port in this generation is the duplicate. The link between the port and the peer is removed and a duplicate error is generated. The stored data associated with the port regarding the peer (port->peerPort) is then updated to the current peer (peerPort) and associated stored data regarding the generation of the peer (port->generation) is updated to the current generation (discoveryGen). An indication of success is then returned so the port is processed.

If the associated stored data regarding the original peer (port->origPeerPort) and generation the original peer was last updated (port->origPeerGen) are not the same as the current peer (peerPort) and generation (discoveryGen) then the current discovery of the port is the duplicate. A duplicate port error is generated and duplication is indicated (return Failure).

In certain embodiments, the method may further include a step of confirming if a duplicate port exists 340. Confirming if a duplicate exists prevents the race condition where a port is moved during a discovery generation. The step of confirming if a duplicate exists may comprise sending direct route discovery packets to the two suspect ports to confirm both have the same GUID. In some embodiments, if no duplicate exists, the method may further include updating the associated stored data regarding the peer to the current peer, updating the associated stored data regarding the generation of discovery to the current generation of discovery, and providing indication that there is no duplication. An example of code that executes this step can be seen below:

```
    if (confirm_duplicate (port->peerPort, peerPort) !=SUCCESS) {
        port->peerPort=peerPort;
        port->generation=discoveryGen
        return SUCCESS
    }
```

This conditional statement checks that the peer of port is active to confirm that the duplicate exists. If the existence of the duplicate is not confirmed then the duplicate no longer exists. The associated stored data regarding the peer (port->peerPort) and the generation of discovery (port->generation) are updated to the current peer (peerPort) and generation (discoveryGen) and indication of success is returned. If duplicate is confirmed, then the determination regarding if the previous discovery is the duplicate 350 is performed. An example of code for the confirm_duplicate function can be seen below.

```
    Confirm_duplicate (peerPort1, peerPort2)
    //get the GUID of the peer port of each of the two suspect peers
    //if the same, then we know a duplicate exists
    //peerPort1 and peerPort2 should be different
    if    get_guid(peerPort1->peer)==get_guid(peerPort2->peer){return SUCCESS
    }
    return FAILURE
```

An example of code for implementing the complete methodology can be seen below:

```
    process_port_check_for_dup (port_data port, int discoveryGen, port peerport)
    if (port->peerport==peerport) {
        // nothing has changed
        port->generation=discoveryGen;
        return SUCCESS
    }
    // peer of this port has changed
    if (discoveryGen !=port->generation) {
        // peer has changed but generation is different
        // port may have just moved; save original peer info
        port->origPeerPort=port->peerPort
        port->origPeerGen=discoveryGen
        port->peerPort=peerPort;
        port->generation=discoveryGen;
        return SUCCESS
    }
    // generation is the same and peer port is different:
    // duplicate GUID exists
    //double check that peer of port is still active
    //to confirm that duplicate exists
    (confirm_duplicate ( ) !=SUCCESS) {
        port->peerPort=peerPort;
        port->generation=discoveryGen
        return SUCCESS
    }
    if    (port->origPeerGen==discoveryGen   &&   port->origPeerPort==peerPort) {
        // previous discovery of port in this generation was duplicate
        remove_link (port to peerPort)
        generate_duplicate_port_error ( )
        port->peerPort=peerPort
        port->generation=discoveryGen;
        // return SUCCESS so this port is still processed
        return SUCCESS
    }
    // peer port is different from the original peer port. This is the
    //duplicate link.
    generate_duplicate_port_error( )
    return FAILURE
```

In operation, during discovery if a change is detected in a port's peer, the generation is checked for the port being examined. If the generation is different, there are two possibilities. One is that the discovery is a duplicate GUID and the original GUID has not been detected yet in the current generation. The other possibility is that a link was just moved to a different port on the subnet. The original peer information is then saved and the port is processed as usual, adding the link to the topology.

If the peer GUID and port is different but the generation is the same then there is most likely a duplicate port on the subnet. To eliminate the race condition of a port moving during a single generation the original peer port is rechecked. The Subnet Manager 130 then determines which of the duplicate links should be removed and which should be included. If the current peer and generation is the same as the stored original peer and generation of original peer then this is the original port. The other link is then marked for removal and a duplicate port error is generated. If the current peer and generation is different from the stored original peer and generation for original peer then the current discovery is the duplicate. An error message is generated and processing of the port is stopped. A new port may then be processed.

Although the illustrative embodiments of the claimed methodology is described in a Infiniband system, the present invention is applicable to any other system having ports, each with a unique global identifier. Other embodiments will be apparent to one skilled in the art given the benefit of this disclosure.

Many alterations and modifications may be made by those having ordinary skill in the art without departing from the spirit and scope of the invention. Therefore, it must be expressly understood that the illustrated embodiments have been shown only for the purposes of example and should not be taken as limiting the invention, which is defined by the following claims. These claims are to be read as including what they set forth literally and also those equivalent elements which are insubstantially different, even though not identical in other respects to what is shown and described in the above illustrations.

What is claimed is:

1. For use with a subnet having a channel adapter and a switch in which the channel adapter and the switch each have a plurality of ports and in which each channel adapter port is intended to have a globally unique identifier and is intended to be connected to a respective one of the switch ports, a method of checking for whether two or more channel adapter ports have the same globally unique identifier during a discovery of the subnet, the method comprising:

for each channel adapter port, storing, by a subnet manager in communication over the subnet with the channel adapter and the switch, the globally unique identifier of the channel adapter port, data indicative of a generation count of discovery for the channel adapter port, data identifying the switch port that the channel adapter port is intended to be connected at an initial time, wherein the switch port that the channel adapter port is intended to be connected at the initial time is an original peer of the channel adapter port, and data indicative of a generation count of discovery for the original peer of the channel adapter port;

selecting at a given time subsequent to the initial time, by the subnet manager, one of the channel adapter ports, wherein the selected channel adapter port is connected at the subsequent time to a given one of the switch ports such that the given switch port is a current peer of the selected channel adapter port;

determining, by the subnet manager, if there is a change between the current and original peers of the selected channel adapter port; and determining, by the subnet manager, that there is no duplication of the globally unique identifier of the selected channel adapter port with the globally unique identifier of any other channel adapter port if the current and original peers of the selected channel adapter port are the same.

2. The method of claim 1 wherein if there is no change between the current and original peers of the selected channel adapter port, the method further comprises:

updating the stored data regarding the generation count of discovery for the selected channel adapter port to a current generation count of discovery for the selected channel adapter port; and providing an indication that there is no duplication of a channel adapter port globally unique identifier.

3. The method of claim 1 wherein if there is a change between the current and original peers of the selected channel adapter port, the method further comprises:

determining if there is change between the generation count of discovery for the selected channel adapter port and a current generation count of discovery for the selected channel adapter port.

4. The method of claim 3 wherein if there is change between the generation count of discovery for the selected channel adapter port and the current generation count of discovery for the selected channel adapter port, the method further comprises:

providing an indication that there is no duplication of a channel adapter port globally unique identifier.

5. The method of claim 3 wherein if there is no change between the generation count of discovery for the selected channel adapter port and the current generation count of discovery for the selected channel adapter port, the method further comprises:

confirming that a duplicate channel adapter port globally unique identifier exists.

6. The method of claim 5 wherein confirming that duplicate channel adapter port exists comprises sending direct route discovery packets to the two suspect channel adapter ports to confirm both have the same globally unique identifier.

7. The method of claim 1 wherein multiple generations of discovery are performed.

8. The method of claim 1 wherein the channel adapter is part of an end node.

9. A networked system operable to detect duplicate port globally unique identifiers, the system comprising:

a subnet having a channel adapter and a switch, wherein the channel adapter and the switch each have a plurality of ports for sending and receiving packets over the subnet, wherein each channel adapter port is intended to have a globally unique identifier (GUID) and is intended to be connected to a respective one of the switch ports; and a subnet manager in communication with the channel adapter and the switch over the subnet, the subnet manager configured to store, for each channel adapter port, the GUID of the channel adapter port, data indicative of a generation count of discovery for the channel adapter port, data identifying the switch port that the channel adapter port is intended to be connected at an initial time, wherein the switch port that the channel adapter port is intended to be connected at the initial time is an original peer of the channel adapter port, and data indicative of a generation count of discovery for the original peer of the channel adapter port;

the subnet manager further configured to select at a given time subsequent to the initial time one of the channel adapter ports, wherein the selected channel adapter port is connected at the subsequent time to a given one of the switch ports such that the given switch port is a current peer of the selected channel adapter port;

the subnet manager further configured to determine during a discovery of the subnet if there is a change between the current and original peers of the selected channel adapter port in order to check for whether two or more channel adapter ports have the same GUID, and determine that there is no duplication of the GUID of the selected channel adapter port with the GUID of any other channel adapter port if the current and original peers of the selected channel adapter port are the same.

10. The system of claim 9, wherein the channel adapter is part of an end node.

* * * * *